Figure 1:
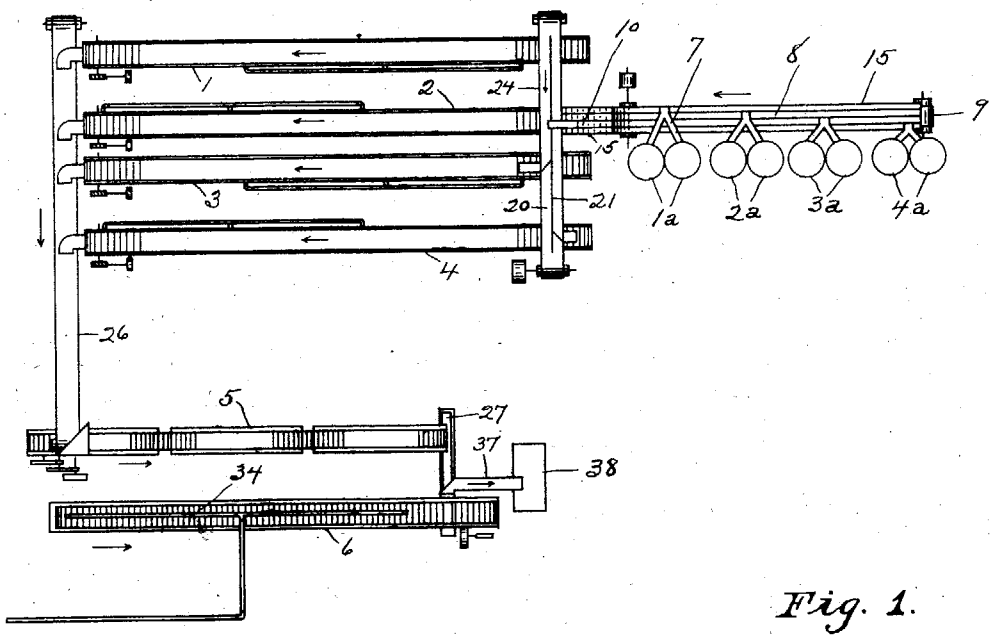

No. 11,875. Reissued Dec. 4, 1900.

F. W. BRIGHT.

PROCESS OF PRESERVING MEATS.

(Application filed Sept. 24, 1900.)

4 Sheets—Sheet 1.

WITNESSES:

K. M. Imboden,

M. L. Lange.

INVENTOR,

Fredrick W. Bright.

BY Higdon & Higdon,

ATT'YS.

No. 11,875. Reissued Dec. 4, 1900.
F. W. BRIGHT.
PROCESS OF PRESERVING MEATS.
(Application filed Sept. 24, 1900.)
4 Sheets—Sheet 2.
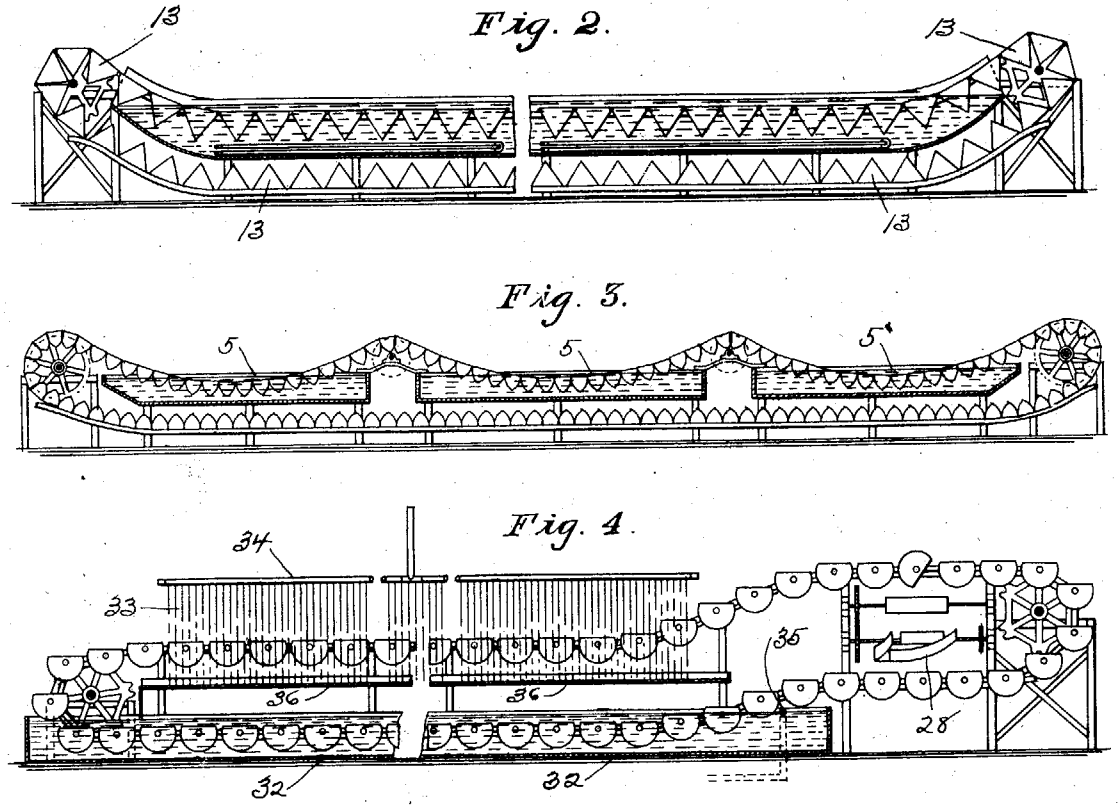
WITNESSES:
K. M. Imboden,
M. L. Lange.
INVENTOR,
Fredrick W. Bright.
BY Higdon & Higdon,
ATT'YS.

No. 11,875. Reissued Dec. 4, 1900.

F. W. BRIGHT.

PROCESS OF PRESERVING MEATS.

(Application filed Sept. 24, 1900.)

4 Sheets—Sheet 3.

WITNESSES:

K. M. Imboden,

M. L. Langer.

INVENTOR,

Fredrick W. Bright.

BY Higdon & Higdon,

ATT'YS.

No. 11,875. Reissued Dec. 4, 1900.

F. W. BRIGHT.

PROCESS OF PRESERVING MEATS.

(Application filed Sept. 24, 1900.)

4 Sheets—Sheet 4.

WITNESSES:

K. M. Imboden,
M. L. Lange.

INVENTOR,

Fredrick W. Bright.
BY Higdon & Higdon,
ATT'YS.

UNITED STATES PATENT OFFICE.

FREDRICK W. BRIGHT, OF KANSAS CITY, KANSAS, ASSIGNOR TO THE ARMOUR PACKING COMPANY, OF SAME PLACE.

PROCESS OF PRESERVING MEATS.

SPECIFICATION forming part of Reissued Letters Patent No. 11,875, dated December 4, 1900.

Original No. 654,563, dated July 24, 1900. Application for reissue filed September 24, 1900. Serial No. 30,965.

*To all whom it may concern:*

Be it known that I, FREDRICK W. BRIGHT, a citizen of the United States, and a resident of Kansas City, in the county of Wyandotte and State of Kansas, have invented new and useful Improvements in Processes of Preserving Food Products in Metallic Cans, of which the following is a specification.

My invention relates to a process for sealing, washing, and cooling cans containing food products, such as meats, fish, oysters, soups, poultry, vegetables, fruits, or any product of any character which can be preserved by using my herein-described process.

One object of my invention is to provide a process by which such products after being placed and sealed in such cans and the cans being passed through my processing arrangements the contents therein will be preserved indefinitely.

A further object which I have in view in producing my invention is that all of the sealing, preserving, cooling, and handling is automatically accomplished, thereby effecting a saving of time and labor; and a still further object of my invention is to prevent loss of weight of the product during the preserving process; and a still further object is to effect a saving of steam used in the preserving of the products; and a still further object is to provide means by which the cans are conveyed throughout the different operations to which they are subjected without the agency of manual labor; and a still further object of my invention is to provide more efficient means for washing, cooling, and preserving canned products than have been heretofore employed.

Hereinafter the term "processing" will be used as a technical equivalent of the word "preserving" as applied to canned products.

With these objects in view my invention consists of certain novel and superior features with the use of certain liquids, as hereinafter described.

I do not claim, broadly, the machinery employed in the process to be described; but said machinery is illustrated by drawings in order to admit of a more explicit description of said process.

Reference is made to the accompanying drawings, in which—

Figure 5:
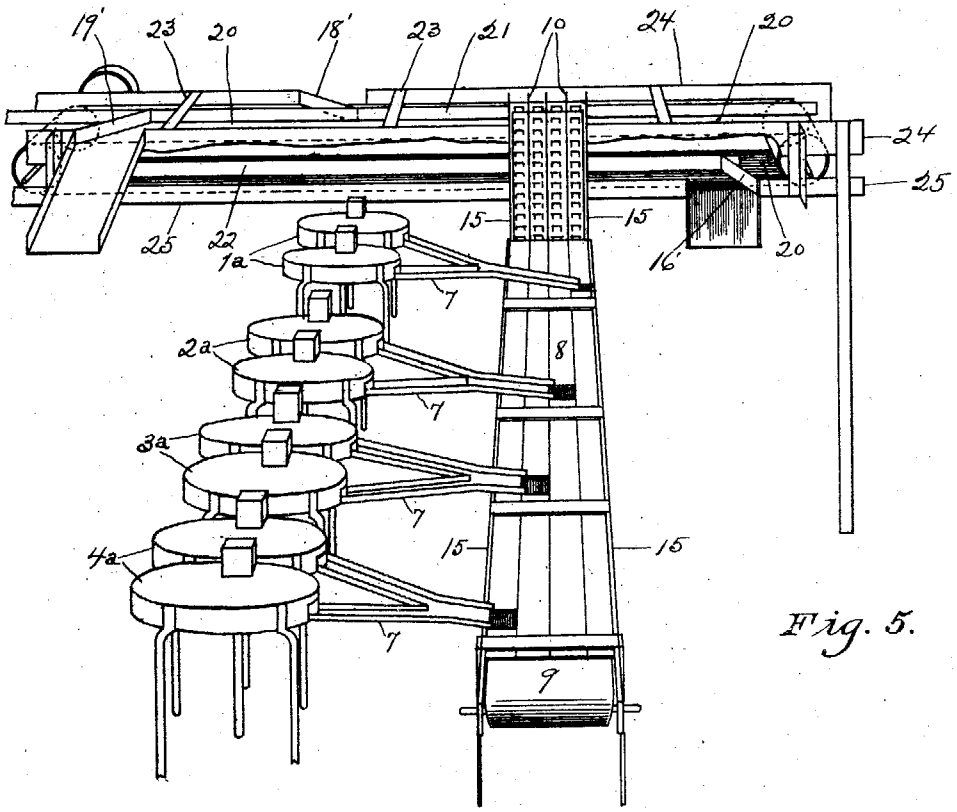
Figure 6:
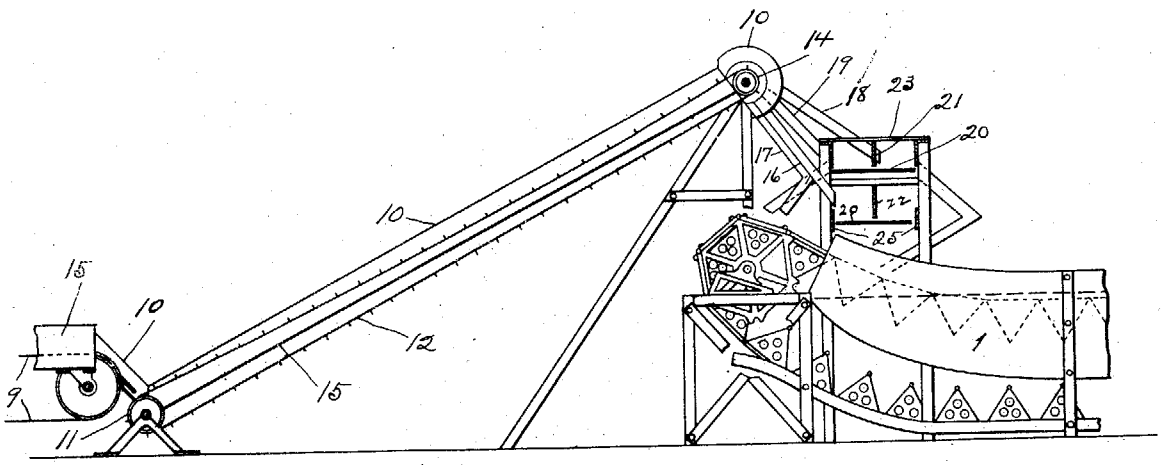

Figure 1 is a diagrammatic plan view of an equipment for carrying my invention into effect. Fig. 2 is a central vertical longitudinal section of a processing-tank and the endless conveyer which carries the cans through said tanks. Fig. 3 is a central vertical longitudinal section of three can-washing tanks and the endless conveyer which carries the cans through said tanks. Fig. 4 is a vertical longitudinal section of a machine for cooling the cans when they leave the washing-machine. Fig. 5 is a perspective view of a set of conveyers for carrying freshly-sealed cans from the sealing-machines into the processing-tanks. The number of processing-tanks required depends partly on the variety of cans to be processed and partly on the differences in the size in said cans. In Fig. 1 four of such machines are represented. Fig. 6 is an elevation of the receiving end of one of said process-tanks, together with part of the apparatus shown by Fig. 5.

The process-tanks and their conveyers will be referred to herein as "process-machines." The washing-tanks and their conveyer will be referred to as the "washing-machine."

Heretofore the procedure in processing canned products has been to leave open the vents in the lids of said cans until the contents were partially processed. Then the cans were removed from the processing apparatus, the vents closed or sealed, and the contents processed again. This first processing involved a loss of several ounces of jellies from each can through the vent thereof. The two separate processings involved a loss of time in handling the cans. My process prevents the escape of jelly from the cans and requires less time and labor than the old process. I seal the vents of the cans before processing. The sealing is done by soldering up the vents in a vacuum created in vacuum-chambers of soldering-machines $1^a$ $2^a$ $3^a$ $4^a$. When sealed, the cans are pushed upon chutes 7, leading from said machine to a table 8, provided with openings in its top through which the cans descend, landing upon a conveyer-belt 9. The top of table 8 has depending from its lower side a plurality of longitudinal partitions 10, running parallel with and close to top of belt 9. The object of said partitions is to keep separate the different sorts and sizes of cans turned out from the different soldering-machines. Side guards 15, secured to table 8, prevent the cans in the outer channels from falling off the belt 9. By this arrangement (shown in Figs. 5 and 6) the cans to be processed in machine No. 1 are sealed in vacuum-machines 1ª. Cans to be processed in machine No. 2 are sealed in vacuum-machines 2ª, and so on.

The devices shown in the drawings for conveying the cans from belt 9 to the process-machines will next be described.

The partitions 10 extend downwardly at the discharge end of table 8 and guide the cans to an elevator-belt 12, driven by a pulley 11. Extensions of partitions 10 are secured close above belt 12 and extensions of side guards 15 are secured at the sides thereof. Belt 12 is of the same width as belt 9 and is provided between said partitions and guards with sets of flights 13 for engaging the cans. The cans are raised by said elevator-belt to the upper pulley 14, from which they descend into four chutes 16, 17, 18, and 19. Chute 17 terminates directly above the receiving end of process-machine 2, as shown in Fig. 6. The other three chutes deposit cans upon different portions of a horizontal distributing-belt 20, mounted on pulleys journaled to a frame suitably supported above the receiving ends of the process-machine. Said frame consists of two central longitudinal partitions 21 and 22, cross-bars 23 for bracing same, and four outer guard-plates 24 and 25 for preventing cans from leaving belt 20, except at certain points to be mentioned. Said partitions 21 and 22 divide this conveyer into four compartments, three of which receive cans from the chutes 16, 18, and 19, respectively. Cans from chute 16 are carried by belt 20 until they come in contact with a vertical oblique plate 16′ and are diverted thereby into a chute which feeds them into process-machine 1. In the same way cans from chutes 18 and 19 are diverted by plates 18′ and 19′ and are fed into process-machines 3 and 4, respectively.

Each process-machine consists of an endless-chain and basket conveyer and a tank through which the conveyer is driven at a very slow rate of motion. Each of said machines is driven independently and is provided with a reducing-gear and a variable-speed device connected with a source of power. Said process-conveyers move on tracks attached to the inner sides of the process-tanks. The baskets 13 of said conveyer become inverted when they are carried underneath the process-tanks. (See Fig. 2.)

An important feature of my invention is the use of a liquid for processing the cans, so that the products in the cans will be preserved. Prior to the employment of liquid applied to the exterior of the cans the contents in them were processed by admitting into the cans live steam in suitable retorts. These retorts had to be opened whenever a batch of cans were placed therein or withdrawn, and during this time the retorts became partially cooled. When they were closed, more steam was required in order to raise the temperature in them to the required point. I attain a high economy of steam by confining the steam in coils of pipe located at or near the bottom of the process-tank. Processing liquid is heated by contact with said pipes at a temperature approximating 240° Fahrenheit. The essential characteristic or property of the liquid is that it shall vaporize but very slowly at the temperature named. No. 1 tallow possesses this property and is preferred by me for a processing liquid; yet inferior grades will answer and other fatty substances may be employed which will produce good results. Said liquid is maintained at the height of about nine (9) inches above the tops of the conveyer-baskets in the tanks. Each process-conveyer is run at a speed suitable for processing the kind of product and the size of cans carried by it in the time during which any particular conveyer-basket is submerged in the processing liquid. The cans after being processed are withdrawn from the tanks by the conveyers, from which they fall upon a transverse conveyer 26, (see Fig. 1,) which conveys them to a point above the receiving end of a washing-machine 5. This machine consists of a plurality of tanks, three being a preferred number, arranged end to end, but not in contact with one another and an endless-chain and basket conveyer carried by sprocket-wheels mounted on said tanks and rails secured to the inner sides of said tanks upon which the conveyer-chains travel. The baskets of said conveyer become inverted when they are drawn underneath the washing-tanks. (See Fig. 3.) The tank through which the cans are first passed is filled with a strong solution of sodium carbonate in hot water. The next tank is filled with a somewhat weaker solution of the same elements. The third tank contains hot water only. The cans are carried through and below the level of said liquids in the order named and are thereby thoroughly cleansed. The washing-machine conveyer descends around a pair of sprocket-wheels at the discharge end of said machine, and here the clean cans descend and lodge upon a transverse conveyer-belt 27, (see Fig. 1,) which carries them to a cooling-machine 6, where they are discharged into a chute 28. (See Fig. 4.) The cooling arrangement consists of a spray 33 of cold water, which discharges into a cooling-tank 32, a pan 36, and an endless-chain and basket conveyer mechanism driving the conveyer, and devices for receiving and discharging the cans into and from said conveyer. The baskets of this conveyer are suspended pi tally from the chains which drive them, so that said baskets maintain their normal positions when said chains are inverted and pass through said tank. From the chute 28 (mentioned above) the cans tumble into said slowly-moving conveyer-baskets, which travel in the direction of the arrows, Fig. 4. Being guided and supported by suitable tracks they descend into the tank 32, which receives a continual supply of cold water at the end from which the baskets emerge and is provided near the opposite end with an overflow-outlet 35, located several inches above the tops of said conveyer-baskets in the tank. The reason for placing said outlet at the point where the hot cans enter the water will be readily perceived. By the time the cans are withdrawn from tank 32 they are partly cooled, and the conveyer passing over a pair of sprocket-wheels at this point the cans move slowly through a spray 33 of cold water falling from a perforated pipe 34. Said spray completes the cooling of the cans and their contents and is received by a pan 36, open at one end, as shown in Fig. 4. The water falls from said open end into the tank 32.

The conveyer-baskets are driven at a rate of motion adapted to the time required for cooling the quantities and sizes of cans carried in said baskets. When the conveyer-baskets arrive at a point above the belt 31, they are successively tilted or swung rearwardly by the action of a cam (not shown) secured to the conveyer-tracks. By this means the cans in the baskets are dumped upon a conveyer-belt 31, driven by gearing from the driving-shaft of the basket conveyer. Belt 31 carries the cans to the upper end of the chute 37, down which they slide to a sorting-table 38, being then ready for painting and labeling.

Having now fully described my process, what I claim as new, and desire to secure by Letters Patent of the United States, is—

1. In a process for preserving food products in metallic cans, which consists in first hermetically sealing said cans containing the products in a vacuum, then processing the same in a liquid, which does not vaporize appreciably at a temperature of 240° Fahrenheit, said liquid being maintained at approximately said temperature; then automatically washing said packages in a solution of sodium carbonate and hot water, then passing them through a body of hot water, then cooling them in cold water, and further cooling them in a stream or spray of cold water, substantially as set forth.

2. In a process for preserving food products in tin cans or cases, which consists in first hermetically sealing said cans in a vacuum, then processing the same by passing them through a bath No. 1 tallow having a temperature of 240°, more or less, Fahrenheit, said temperature being maintained by a volume of steam confined in pipes in said bath of tallow; next, in automatically removing the grease from said cans by passing them through three cleaning-baths in succession; the first being a strong solution of sodium carbonate in hot water, the next being a weaker solution of the same, and the last consisting of hot water only; finally in automatically passing the cans so cleaned, through a body of cold water and then through a stream or spray of cold water, substantially as set forth.

FREDRICK W. BRIGHT.

Witnesses:
GEORGE W. TOUETELLOT,
C. A. JONES.